United States Patent [19]

Finley et al.

[11] Patent Number: 4,822,583

[45] Date of Patent: Apr. 18, 1989

[54] PHOSPHATE FEED MATERIAL FOR PHOSPHORUS ELECTRIC FURNACES AND PRODUCTION OF SAME

[75] Inventors: Joseph H. Finley, Metuchen, N.J.; Lewis L. Hammermeister, Pocatello, Id.; Jared S. Sproul, Belle Mead, N.J.

[73] Assignee: FMC Corporation, Philadelphia, Pa.

[21] Appl. No.: 86,014

[22] Filed: Aug. 17, 1987

[51] Int. Cl.$^4$ .............................. C01B 25/01
[52] U.S. Cl. .................... 423/322; 423/323
[58] Field of Search ............. 423/322, 323, 274, 307; 75/3, 25

[56] References Cited

U.S. PATENT DOCUMENTS

| | | | |
|---|---|---|---|
| 1,534,828 | 4/1925 | Barr | 75/257 |
| 2,040,081 | 5/1936 | Curtis | 23/108 |
| 2,072,981 | 3/1937 | Curtis | 423/323 |
| 2,143,001 | 1/1939 | Curtis | 423/323 |
| 2,776,828 | 1/1957 | Marcellus et al. | 263/53 |
| 3,032,408 | 5/1962 | Baumann | 71/64 |
| 3,169,054 | 2/1965 | Werner | 75/25 |
| 3,335,094 | 8/1967 | Darby | 423/323 |
| 3,345,443 | 10/1967 | Ziegler et al. | 264/117 |
| 3,773,473 | 11/1973 | Howard et al. | 23/293 R |
| 4,372,929 | 2/1983 | Barber | 423/323 |
| 4,373,893 | 2/1983 | Barber | 425/222 |
| 4,383,847 | 5/1983 | Barber | 71/34 |
| 4,421,521 | 12/1983 | Barber | 44/16 R |
| 4,451,277 | 5/1984 | Barber | 71/36 |
| 4,514,366 | 4/1985 | Barber | 423/318 |
| 4,537,615 | 8/1985 | Barber | 71/36 |
| 4,537,756 | 8/1985 | Rottgen et al. | 423/323 |
| 4,656,020 | 4/1987 | Barber | 423/323 |

FOREIGN PATENT DOCUMENTS

| | | |
|---|---|---|
| 52-155197 | 12/1977 | Japan . |
| 649651 | 2/1979 | U.S.S.R. . |
| 742376 | 6/1980 | U.S.S.R. . |
| 823277 | 4/1981 | U.S.S.R. . |

OTHER PUBLICATIONS

Pashchenko, V. N. Olontsev, I. F., Lozhkin, A. F., Mamonov, O. V. (Perm. Politekh. Inst. Perm. (USSR), Izv. Vyssh. Uchebn. Zaved., Khim. Khim. Tekhnol. 1979, Physiocochemical Principles of the Preparation of a Granular Charge for Defluorination (Abstract).

*Primary Examiner*—Peter D. Rosenberg
*Attorney, Agent, or Firm*—Robert D. Jackson; Frank Ianno

[57] ABSTRACT

Compacted shapes of phosphatic material, suitable as a charge for a phosphorus furnace, are produced by compacting a mixture of calcined phosphate fines and phosphoric acid. The compacted shapes are conveniently produced on a roll briquetting press.

7 Claims, No Drawings

PHOSPHATE FEED MATERIAL FOR PHOSPHORUS ELECTRIC FURNACES AND PRODUCTION OF SAME

This invention relates to phosphatic feed material for a phosphorus electric furnace. More particularly, the invention is concerned with a phosphatic feed material and the production thereof from recovered calcined phosphate ore.

In the electrothermal manufacture of elemental phosphorus, a feed stream of phosphatic material such as calcined phosphate ore, a carbonaceous reductant such as coke and optionally a fluxing agent such as silica are charged into an electric furnace. The charge materials undergo resistive heating which results in the formation of a molten reaction mass. Reduction of the phosphate ore to phosphorus produces a gaseous mixture of phosphorus vapor, carbon monoxide and particulates. After freeing of particulates by electrostatic precipitation, the gaseous stream is water quenched and the phosphorus recovered and stored under water. The furnace is tapped periodically to remove molten slag and ferrophosphorus.

In a typical method of preparing the phosphatic feed material, raw phosphate ore is first formed into aggregates or agglomerates of the requisite size by compacting comminuted phosphate ore with a binder to form shaped articles such as pellets or briquettes. These are then calcined to increase their crush strength. The procedure is much used in the processing of phosphate shales such as occur in the western portions of the United States. These shales usually contain clay which undergoes sintering during calcination thereby acting as a binder for the phosphate particles to give a high strength agglomerate. The technique is not, however, applicable to clay deficient shales or to other phosphates lacking binding properties. Agglomeration of such materials requires additional clay or other binder.

It is known to use phosphoric acid as a binder in the processing of phosphate ore for use as a feed in smelting operations. For example, in U.S. Pat. No. 1,534,828 to Barr, there is described a process of preparing metallurgical aggregates of phosphate ore by briquetting a mixture of particulate phosphate rock and phosphoric acid. According to the patent specification, the phosphoric acid reacts with the tricalcium phosphate in the phosphate ore to form acid phosphate salts. The chemical reaction is confined to the surface of the phosphate ore particles since only enough phosphoric acid is added to partially convert the tricalcium phosphate to mono- or decalcium phosphate. It is suggested that the acid salts thus formed in situ cause a hardening or set to take place which together with the pressure of briquetting result in a product having the requisite metallurgical properties.

Other prior art references pertaining to phosphoric acid as a binder for phosphate ore are summarized below:

1. A 1979 Russian publication (see CA 91:76241d) describes a process for mixing phosphate raw material and phosphoric acid (35%–37% $P_2O_5$) to a $CaO/P_2O_5$ ratio of 1.1–1.8 and pelletizing and drying the mixture in a fluidized bed. The structural stability of the granules was attributed to formation of $Ca(H_2PO_4)_2 \cdot H_2O$ bridges which are converted into $CaHPO_4$, $Ca_2P_2O_7$ and $Ca(PO_3)_2$ on heating in the fluidized bed.
2. USSR Patent No. 649,651 discloses the use of $H_3PO_4$ as a binder for pelletizing phosphate ore (presumably shale). The agglomerates are heat-treated at 250° C.–300° C.
3. USSR Patent No. 823,277 describes a process in which phosphate ore, quartzite and coke are mixed, moistened with water, combined with a binder, ($H_3PO_4$, $H_2SO_4$, sodium silicate or milk of lime) and agglomerated.
4. USSR Patent No. 742,376 states that agglomeration of phosphate raw material was improved by use of $H_3PO_4$.
5. USSR Patent No. 742,376 states that pelletizing of phosphate raw materials was improved by use of phosphoric acid and granulation techniques.
6. Japan Kokai, No. 77,155,197 describes a process in which powdered phosphate rock is mixed with 2%–8% of 20%–80% $H_3PO_4$ and pelletized. Strength is improved by drying at 500° C. for 20 minutes. The pellets could be used successfully for elemental phosphorus manufacture.
7. U.S. Pat. No. 2,040,081 describes a process by which a pugged mixture of fine phosphate rock and an inorganic acid such as $H_3PO_4$ (less than 40% strength) is formed into spheriodal masses on mixing in a rotary blender.
8. U.S. Pat. No. 4,372,929 describes a process for agglomerating phosphate shale with phosphoric acid, water and ammonia.
9. U.S. Pat. No. 4,373,893 discloses a bench-scale agglomerator and a process for the agglomeration of shale or coke. Various binders such as phosphoric acid or waste water from a phosphorus plant are claimed to be useful.
10. U.S. Pat. No. 4,383,847 and U.S. Pat. No. 4,421,521 describe processes for making agglomerates from beneficiated phosphate ore or coke using phosphoric acid and ammonia as the binder.
11. U.S. Pat. No. 2,776,828 to Marcellus et al describes the pelletization of phosphate shale employing screened shale fines of increased clay content as a binder.
12. U.S. Pat. No. 3,032,408 to Baumann discloses including phosphate dust during pelletization of phosphate ores. The binder is an alkali metal metaphosphate.
13. U.S. Pat. No. 3,345,443 to Ziegler et al discloses a process for making phosphate pellets by spraying crude phosphate fines on a granulating plate with an aqueous alkali metal solution containing a suspension of bentonite, phosphorus production off-gas electrofilter dust and fine phosphate dust.
14. U.S. Pat. No. 3,773,473 to Howard et al discloses a beneficiated calcined phosphate agglomerate produced by calcining crushed shale in a fluidized bed to form a phosphorus rich coarse fraction and phosphorus poor fines fraction and using the phosphorus rich fraction to prepare the agglomerates.
15, 16 and 17.
U.S. Pat. Nos. 4,451,277, 4,514,366 and 4,537,615 to Barber are concerned with the production of liquid fertilizers from a phosphorus furnace waste stream. Also disclosed is the use of impure phosphoric acid obtained by burning phosphorus sludge to agglomerate phosphate ore.
18. U.S. Pat. No. 4,537,756 to Rottgen et al is directed to removing foreign components, especially zinc, from a yellow phosphorus plant by pelletizing the dust from the electrostatic precipitator using crude ground phosphate and slag as binders.

An advantage in using phosphoric acid in the agglomeration of phosphate ore is the fact that the acid phosphates, due to acidulation of the tricalcium phosphate, are themselves an excellent binding material and which are reduced in the smelting reaction thereby adding to the yield of phosphorus. Also, the process can be carried out using crude phosphoric acid such as unpurified green acid, a favorable economic advantage. Unfortunately, the phosphoric acid reacts with sulfide minerals often present in the phosphate rock to produce hydrogen sulfide. In any commercial operation, a scrubber or some form of pollution control would most likely be required to meet environmental regulation and standards. This, of course, would add to plant capital and operating costs.

It has now been discovered that the polution effects from hydrogen sulfide evolution associated with the use of phosphoric acid binder in producing phosphate ore aggregates can be obviated by replacing the raw phosphate ore with calcined ore for mixing with the acid. Apparently, calcining inactivates the sulfides in some manner, possibly by converting them to the corresponding sulfates which should not react with the phosphoric acid, at least insofar as producing hydrogen sulfide. The aforesaid explanation is, of course, advanced in the nature of a theory or suggestion since the actual mechanism of the hydrogen sulfide suppression has not been ascertained.

The accumulation of calcined phosphate fines from phosphorus smelting has long been an ongoing problem. One solution is to recycle the fines back to the agglomerator where phosphate shale raw material is being formed into briquettes for delivery to the calciner. The problem with this approach is that the calcined material is not amenable to compaction since the binding properties of the phosphate shale are destroyed by calcination. If recycle material is mixed in appreciable quantities with fresh ore feed, the binding power of the clay is diluted with concomitant reduction in briquette strength. As a consequence, the quantity of by-product calcined phosphate that can be processed by recycling is limited to a fraction of that recovered from the calciner.

By recovering and utilizing the calcined phosphate fines in accordance with the invention, the fines are prevented from entering the phosphorus furnace where their presence is detrimental as they cause gas channeling with consequent reduction in furnace efficiency.

It can thus be seen that the present invention fills two long felt needs; it provides a practical and economic means of utilizing recovered calcined phosphate while overcoming the pollution problem attendant the use of phosphoric acid as a binder medium for phosphate ore.

In the general practice of the invention, calcined phosphate ore and phosphoric acid are formed into a homogeneous mixture which is then compacted into shaped articles such as pellets or briquettes. For industrial applications, the mixing can be effected in a pug mill while compaction into formed shapes can be carried out in a roll briquetting press. Pug mills and briquetting presses are well known manufactured pieces of equipment. A convenient source of the calcined phosphate ore is the nodule fines recovered from the calciner of a commercial phosphorus plant. These typically range in size distribution from about 0.6 cm. to finely divided powder. Briquettes have been prepared using various screened sizes of such calcined material and mixtures thereof including burden dust. The size distribution of a representative specimen of recovered calcined phosphate ore is given below:

| USS Series Sieve | Cumulative % Ore Retained by Sieve |
|---|---|
| 8 mesh | 16.3 |
| 18 mesh | 48.2 |
| 30 mesh | 59.9 |
| 50 mesh | 71.8 |
| 100 mesh | 82.8 |

Burden dust is recovered from the baghouse and normally consists entirely of $-100$ mesh material.

The phosphoric acid binder employed in the practice of the invention need not be concentrated or especially purified or refined. It should, however, be free of contaminants that could deleteriously affect the quality of the phosphorus. A technical grade of acid is usually satisfactory and in this connection, wet process phosphoric acid, commonly referred to as green acid, has proved to be generally suitable. The strength of the acid can vary considerably, briquettes of sufficient strength having been obtained using green acid assaying as $H_3PO_4$ by weight from about 30% to about 85%. A workable and convenient concentration is about 70% as $H_3PO_4$.

The quantity of phosphoric acid binder is not particularly critical although extremes both in regards to acid strength and quantities should be avoided. As understood herein, all components are expressed on a weight basis unless indicated otherwise. Generally speaking, high strength briquettes have been obtained using a phosphoric acid content ranging from about 4% to about 12% on a 70% $H_3PO_4$ $$\% \text{ By Weight Binder Concentration} = \frac{\text{wt. of } H_3PO_4 \text{ of spec. strength})(100)}{\text{wt. of acid} + \text{wt. of calcined fines}}$$

basis. As understood herein, binder concentration is defined as follows:

Addition of water excluding that contained in the binder acid was often found to improve the mechanical strength of the compacted shapes. The percent of added or free water above that in 100% $H_3PO_4$ is computed as follows:

$$\% \text{ by wt. water} = \frac{(\text{wt. of free water above 100\% } H_3PO_4)(100)}{\text{wt. of solids} + \text{binder acid} + \text{added water}}$$

Water concentrations of from about 4% to about 15% gave strong pellets prepared in a Carver piston press. In roll briquetting operations, the total water content as defined above should not exceed about 13% to about 14%, if briquette quality is to be maintained.

Compacting pressure is another factor affecting the strength of the agglomerated product. In the case of pellets, at a given binder and water concentration, pellet strength was significantly improved by increasing the applied pressure. This pressure ranged from about 455 to about 3636 Kg. with 1818 to 2727 Kg. being preferred.

The initially formed or green briquettes tend to be low in mechanical strength. As a consequence, the briquettes were prone to chipping and abrasion during handling or while being transported. However, green strength can be improved by means of precompaction techniques and/or by the use of low levels of supplementary binders such as bentonite. As carried out herein, precompaction comprises the following sequence of steps:

(1) compacting a mixture of calcined fines and acid binder;
(2) granulating the compacted mixture;
(3) sieving the granulated material through a half inch screen, and
(4) recompacting the screened material.

The precompacting and compacting steps can be performed using a roll briquetting press of the standard type. Improved strength derives from the fact that the effective pressure exerted on the material in the second compacting step is significantly greater than in the first step.

The green agglomerated shapes are cured to promote hardening. High mechanical strength is achieved by heating the green shapes, typically pellets or briquettes, at temperatures ranging from 100° C. to about 900° C. until the requisite strength was reached. The period of heating is normally about 0.75 hours or more. The preferred curing temperatures are about 100° C. or higher to ensure that the free and hydrate water is expelled. Most preferably, curing is effected at about 200° C. for about one hours. Strength can also be increased markedly by aging the agglomerates at ambient temperatures for a sufficient time, generally in the neighborhood of about six hours. Curing or aging is believed to involve a chemical reaction between the calcined phosphate fines and phosphoric acid to form mono- and/or dicalcium phosphates as in the case when using the raw phosphate ore. Apparently, the acid phosphate salts function as a cement or matrix to bind the particles of calcined fines together. However, in contrast to the raw phosphate ore, acidulation of calcined phosphate does not cause evolution of hydrogen sulfide.

It can thus be seen that by the present invention, it becomes commercially feasible to employ phosphoric acid in the production of a phosphatic furnace feed while at the same time providing a means for disposing of and utilizing calcined phosphate fines which accumulate as an undesirable by-product in the manufacture of elemental phosphorus.

The invention can be incorporated in an existing phosphorus plant as an add-on feature comprising phosphate fines recovery means; means for mixing acid binder and fines; compacting means and means for delivery of compacted shapes to the furnace.

The invention is illustrated in further detail by the following test procedures and examples in which compositions are on a weight percent basis.

GENERAL PREPARATIONS

Mixing Procedure—The phosphoric acid and other components were blended together using a standard mixing device such as a Hobart Blender or a Littleford Blender.

Pellet Preparation—Cylindrical pellets (ca. 2.8 x 2.8 cm.) were prepared in a Carver press from 35.0 gram samples of blends prepared from nodule fines (0.6 cm.), phosphoric acid and, optionally, burden baghouse dust and free water. Baghouse dust consisted entirely of −100 mesh material. Nodule fines and baghouse dust were recovered from the phosphate ore (shale) calciner of a phosphorus plant. A typical size distribution for the nodule fines is given below.

| USS Series Sieve | Cumulative % on Sieve |
|---|---|
| 8 mesh | 16.3 |
| 18 mesh | 48.2 |
| 30 mesh | 59.9 |
| 50 mesh | 71.8 |
| 100 mesh | 82.8 |

Briquette Preparation—Pillow-shaped briquettes (4.45×4.45×3.2 cm.) were made in a standard roll briquetting pilot press.

Curing Step—Green pellets or pillow briquettes were routinely cured at 200° C. for one hour in a laboratory oven.

TEST PROCEDURES

Abradability Test—This test was used to compare the strength of cylindrical pellets prepared in the laboratory. Four pellets were weighed and placed in a 6 mesh screen (USS series), equipped with a metal cover and receiving pan. This assembly was shaken in a Tyler Model RX 24 Portable Sieve Shaker for 20 minutes. The total quantity of material abraded from the pellets was determined by weighing and was calculated as a percentage of the original weight of the four pellets.

Tumble Index—This test was used to evaluate the mechanical strength of green and cured briquettes made in the plant test. The apparatus consisted of a cylindrical metal drum (35.6 cm. diameter ×35.6 cm. length), equipped with a two inch steel lifter extending lengthwise. Green strength was determined by tumbling 15 briquettes at 43 rpm for exactly one minute. The product was then screened through the following sieves: 3.8 cm., 2.54 cm., 1.9 cm., 1.3 cm., 0.6 cm. and 6 mesh. The Tumble Index is defined as the percentage of 1.9 cm. material, based on the original sample weight. Good shale briquettes give values of 90% or higher in this test. Cured strength was determined by tumbling eight cured briquettes in one apparatus and seven in another at 43 rpm for ten minutes. The samples were then combined and screened in the same manner as the green briquettes. The Cured Tumble Index is the percentage of 1.9 cm. material based on the original weight of 15 briquettes. Calcined shale briquettes removed from the upper half of the pellet bed typically gave Tumble Index values averaging about 30%.

EXAMPLE 1

The ability of 85% phosphoric acid to bind nodule fines into pellets exceeding those obtained with raw shale in mechanical strength is exemplified by results in Table I.

TABLE I

| | Effect of 85% $H_3PO_4$ | | |
|---|---|---|---|
| Solid Feedstock | % 85% $H_3PO_4$ | Green | % Abraded Calcined (900° C.) |
| Phosphate Ore | | | |
| Shale Alone | — | 18 | 5 |
| Nodule Fines | 2.0 | 95 | 53 |
| Nodules Fines | 4.0 | 32 | 18 |
| Nodule Fines | 6.0 | 8 | 4 |

EXAMPLE 2

To show the effect of curing at 100° C., laboratory pellets were prepared from a solid blend containing 70% nodule fines and 30% burden dust. Crude 70% phosphoric acid was used as the binder at an 8.0% level. The water content as defined above was 10.5%. The green pellets abraded to the extent of 46% while those cured at 100° for 45 minutes underwent only 4% abrasion.

EXAMPLE 3

A series of 28 laboratory runs were performed employing a Central Composite experimental design. The variables and their ranges were as follows:

| | |
|---|---|
| % Baghouse Dust in Solids | 5.0 to 55.0 |
| Binder percent | 2.0–10.0 |
| % Water | 4.0–14.0 |
| Pelletizing Pressures | 455–2727 Kg. |

The pellets were cured at 200° C. for one hour and were tested for abradability. All of the variables except burden dust were indicated have a statistically significant effect. The beneficial effect of increasing phosphoric acid concentrations from about 4% to 8% is shown in Table II. The data also indicate the improved pellet strength obtainable by increasing the pressure.

TABLE II

Effect of 70% $H_3PO_4$ Binder Concentration on Abradability 96.5% Water in Blend

| % Binder | Pelletizing Pressure, Kg. | % Abradability |
|---|---|---|
| 4.2 | 455 | 100 |
| 5.2 | 455 | 76 |
| 6.0 | 455 | 61 |
| 6.8 | 455 | 43 |
| 8.4 | 455 | 23 |
| 9.2 | 455 | 8 |
| 2.0 | 1591 | 100 |
| 3.6 | 1591 | 70 |
| 5.2 | 1591 | 45 |
| 6.8 | 1591 | 12 |
| 7.6 | 1591 | 5 |

Data in Table III show that significantly better strength can be obtained by increasing the water content. In this example, the water concentration was increased from 6.5% to 11.5%.

TABLE III

Effect of Water on Abradability[a]

| % Binder (70% $H_3PO_4$) | 6.5% $H_2O$ | % Abradability 11.5 $H_2O$ |
|---|---|---|
| 2.0 | 100 | 95 |
| 3.6 | 70 | 54 |
| 5.2 | 45 | 23 |
| 6.8 | 12 | 3 |
| 7.6 | 5 | — |

[a]30% baghouse dust was used in all blends. The pelletizing pressure was 1591 Kg.

EXAMPLE 4

This example illustrates that dilute (30%) $H_3PO_4$ is an effective binder. A 70/30 blend of nodule fines and dust was combined with several concentrations of 30% $H_3PO_4$ (Table IV) and the water content adjusted to 13.1% in each case. Pellets were prepared at 2727 Kg. and cured at 200° C. for one hour. Results are shown in Table IV.

TABLE IV

Effect of 30% $H_3PO_4$

| % Binder As 30% $H_3PO_4$ | % Binder as 70% $H_3PO_4$ Equivalent | % Abraded |
|---|---|---|
| 11.9 | 5.4 | 5.4 |
| 14.9 | 7.0 | 3.1 |
| 14.9 | 7.0 | 1.7 |
| 18.7 | 9.0 | 0.6 |

EXAMPLE 5

A series of plant briquetting tests was carried out using three grades of nodule fines (−10 mesh, −6 mesh and 0.6 cm.). Burden dust was incorporated (as 32.6% of the total solid) in several runs and omitted in the remaining tests. A crude grade of dilute (39.5%) $H_3PO_4$ was used in all of the tests (Note: for ease of comparison with previous and subsequent examples, the binder concentration in this example is expressed as the 70% $H_3PO_4$ equivalent). The water content was also varied. The ingredients were mixed in a 57 liter Littleford blender and a standard pilot roll briquetting machine was used.

Results obtained with the nodule fines-burden dust mixtures constitute this example. Results are summarized in Table V. Where the water content was 12% or less, the Tumble Indices of cured briquettes containing 9% or more $H_3PO_4$ were significantly better than that obtained for calcined shale briquettes from a commercial phosphorus plant. It was observed too that the briquettes did not readily disengage from the rolls if the water content exceeded about 12%.

TABLE V

Briquetting Test Results - Nodule Fines Burden Dusts Blends*

| Nodule Fines Sizing | % Binder as 70% $H_3PO_4$ | % Water | Tumble Index Green | Cured |
|---|---|---|---|---|
| −10 mesh | 6.5 | 10.0 | 2.7 | 2.5;0 |
| −10 mesh | 9.0 | 9.0 | 5.4 | 51.1 |
| −10 mesh | 9.0 | 12.5 | 21.4 | 20.8;9.5 |
| −10 mesh | 9.0 | 12.5 | 19.2 | 39.7 |
| −10 mesh | 10.5 | 10.4 | 22.1 | 79.5 |
| −10 mesh | 10.5 | 10.4 | 27.9 | 88.2 |
| −10 mesh | 10.5 | 10.4 | 41.0 | 79.0 |
| −¼ inch | 10.5 | 10.4 | 24.3 | 90.4 |
| −10 mesh | 10.5 | 11.6 | 24.4 | 85.2 |
| −10 mesh | 10.5 | 11.9 | 17.0 | 76.6 |
| −10 mesh | 10.5 | 12.5 | 23.5 | 90.5 |
| −10 mesh | 10.5 | 13.5 | 34.4 | 23.9 |
| −6 mesh | 10.5 | 13.5 | 89.3 | 11.2 |
| −10 mesh | 12.0 | 11.8 | 50.2 | 87.0 |
| −10 mesh | 12.0 | 12.5 | 39.0 | 96.6;81.4 |
| −10 mesh | 12.0 | 13.5 | 69.6 | 39.3 |
| −10 mesh | 115.0 | 16.8 | Poor Briquetting | |

*All solid blends contained 67.4% (by weight) nodule fines and 32.6% burden dust.

EXAMPLE 6

Tests similar to those in Example 5 were performed on nodule fines to which no burden dust had been added. Excellent Tumble Indices were obtained from mixtures prepared with 8%–12% $H_3PO_4$ (70% basis) and about 8%–12% water (Table VI).

TABLE VI

Briquetting Test Results - No Burden Dust

| Nodule Fines Sizing | % Binder As 70% H3PO4 | % Water | Tumble Index Green | Cured |
|---|---|---|---|---|
| −6 mesh | 6.5 | 15.0 | 16.6 | 3.3 |
| −6 mesh | 8.0 | 8.1 | 1.7 | 45.5 |
| −6 mesh | 9.0 | 9.9 | 13.1 | 81.5 |
| −6 mesh | 9.0 | 11.5 | 19.2 | 43.6 |
| −¼ inch | 9.0 | 9.0 | 15.0 | 81.9 |
| −6 mesh | 10.5 | 10.4 | 36.1 | 92.5 |
| −6 mesh | 10.5 | 10.4 | 12.6 | 90.6 |
| −¼ inch | 10.5 | 10.4 | 19.6 | 34.8 |
| −6 mesh | 10.5 | 11.9 | 2.0 | 2.4 |
| −6 mesh | 10.5 | 12.5 | too wet to briquette | |
| −6 mesh | 10.5 | 13.5 | too wet to briquette | |
| −6 mesh | 11.0 | 12.2 | 24.3 | 91.8 |
| −6 mesh | 12.0 | 12.5 | too wet to briquette | |

EXAMPLE 7

Results in Tables V and VI (Examples 5 and 6) show that green briquettes made with $H_3PO_4$ binder are generally weak and would therefore require very careful handling in a plant process. However, by precompacting the green mixture it was possible to increase the agglomerate green strength substantially. Precompaction was performed in this example by granulating the initially formed green briquettes through a 1.27 cm. screen and re-briquetting the 1.27 cm. material. Results in Table VII illustrate the improved proved green strength. The cured strength is also shown to improve as the result of precompaction.

TABLE VII

Effect of Precompaction

| Run No. | % Binder | % H2O | Test Conditions | Tumble Index Green | Cured |
|---|---|---|---|---|---|
| 1 | 10.5 | 10.4 | Initial run with no precompaction | 22.1 | 79.5 |
| 2 | 10.5 | 10.4 | Granulated and rebriquetted greens from Run 1 | 43.8 | 91.3 |
| 3 | 10.5 | 11.9 | Initial run with no precompaction | 2.0 | 2.4 |
| 4 | 10.5 | 11.9 | Granulated and rebriquetted green from Run 3 | 43.3 | 45.6 |
| 5 | 10.5 | 11.9 | Granulated and rebriquetted greens from Run 4 | 52.0 | 80.3 |

EXAMPLE 8

Data (Table VIII) in this example show that the green and cured strength of the pilot briquettes was improved significantly by use of low levels of bentonite. Still further improvement was obtained by use of bentonite additive and the precompaction technique described in Example 7.

TABLE VIII

Effect of Precompaction and/or Bentonite Additive

| | Green Tumble Index | | Cured Tumble Index | |
|---|---|---|---|---|
| | Initial | Precom. | Initial | Precompact. |
| No Bentonite | 22 | 44 | 80 | 91 |
| 2% Bentonite | 28 | 63 | 88 | 85 |
| 5% Bentonite | 41 | 84 | 79 | 93 |

EXAMPLE 9

In order to constitute suitable feedstock for a phosphorus-producing furnace, it is important that the agglomerates produced by this invention do not break apart readily and generate fines upon entry into the furnace. To evaluate their ability to withstand high temperatures, laboratory pellets were "fired' at 1000° C. in an inert atmosphere then cooled and tested for abradability. As shown below (Table IX), pellets prepared with molasses (a well-known binder) were readily degraded after firing, while those containing the $H_3PO_4$ binder maintained high strength.

TABLE IX

Effect of Firing

| Binder Type | % Binder | Post Treatment Conditions | % Abraded |
|---|---|---|---|
| Molasses | 8.2 | Cured only | 3.1 |
| Molasses | 8.2 | Cured and Fired (1000° C.) | 95.7 |
| Phosphoric Acid (70%) | 6.5 | Cured only | 4.0 |
| Phosphoric Acid (70%) | 6.5 | Cured and Fired (1000° C.) | 5.4 |

We claim:
1. In the production of elemental phosphorus wherein a feed stream of suitably sized calcined phosphate ore from a calcining zone is charged into a phosphorus reduction furnace and calcined phosphate ore fines recovered from the calcining zone, the improvement of utilizing the recovered calcined fines as an added source of phosphorus comprising the steps:
   1. forming a homogeneous mixture of the fines with phosphoric acid binder;
   2. compacting the mixture into green shaped articles,
   3. curing the green shaped articles to increase their crush strength, and
   4. introducing the cured shaped articles into the furnace for reduction to elemental phosphorus.

2. The improvement according to claim 1 wherein the compacting is carried out in a roll briquetting press to give briquettes as the shaped articles.

3. The improvement according to claim 1 wherein the concentration by weight of the phosphoric acid binder is from about 30% to about 85% as $H_3PO_4$.

4. The improvement according to claim 3 wherein the phosphoric acid binder content of the mixture ranges from about 4% to about 12% or 70% phosphoric 5. The improvement according to claim 4 wherein the phosphoric acid binder content is from about 9% to about 12% of 70% phosphoric acid.

6. The improvement according to claim 2 wherein the green briquettes are crushed to form granules and the granules rebriquetted to give briquettes of increased mechanical strength.

7. The improvement according to claim 2 wherein curing is effected by heating the green briquettes at temperatures from about 100° C. to about 900° C. until the desired strength is attained.

* * * * *

UNITED STATES PATENT AND TRADEMARK OFFICE
CERTIFICATE OF CORRECTION

PATENT NO. : 4,822,583

DATED : April 18, 1989

INVENTOR(S) : Joseph H. Finley, Lewis L. Hammermeister and Jared S. Sproul

It is certified that error appears in the above-identified patent and that said Letters Patent is hereby corrected as shown below:

Column 10, line 57, "12% or 70%" should read --12% of 70%--.

Signed and Sealed this

Ninth Day of July, 1991

Attest:

HARRY F. MANBECK, JR.

Attesting Officer

Commissioner of Patents and Trademarks